(12) United States Patent
Li

(10) Patent No.: US 11,077,377 B2
(45) Date of Patent: Aug. 3, 2021

(54) METHOD FOR GAME LOADING AND RELATED PRODUCTS

(71) Applicant: Guangdong Oppo Mobile Telecommunications Corp., Ltd., Guangdong (CN)

(72) Inventor: Senlin Li, Guangdong (CN)

(73) Assignee: GUANGDONG OPPO MOBILE TELECOMMUNICATIONS CORP., LTD., Dongguan (CN)

(*) Notice: Subject to any disclaimer, the term of this patent is extended or adjusted under 35 U.S.C. 154(b) by 56 days.

(21) Appl. No.: 16/536,864

(22) Filed: Aug. 9, 2019

(65) Prior Publication Data
US 2020/0094147 A1    Mar. 26, 2020

(30) Foreign Application Priority Data

Sep. 20, 2018 (CN) .......................... 201811101060.7

(51) Int. Cl.
A63F 9/24 (2006.01)
A63F 13/77 (2014.01)
A63F 13/48 (2014.01)

(52) U.S. Cl.
CPC .............. *A63F 13/77* (2014.09); *A63F 13/48* (2014.09); *A63F 2300/552* (2013.01); *A63F 2300/636* (2013.01)

(58) Field of Classification Search
CPC ........ A63F 13/12; A63F 13/30; A63F 13/335; A63F 13/35; A63F 13/352; A63F 13/358; A63F 13/77; A63F 2300/402; A63F 2300/513; A63F 2300/552; H04N 21/4781
See application file for complete search history.

(56) References Cited

U.S. PATENT DOCUMENTS

| 2004/0111755 | A1  | 6/2004  | Perlman |
| 2005/0045025 | A1  | 3/2005  | Wells et al. |
| 2010/0124992 | A1* | 5/2010  | Park ................. G06F 15/16 463/42 |
| 2010/0248823 | A1* | 9/2010  | Smith ................ A63F 13/12 463/29 |
| 2016/0378462 | A1* | 12/2016 | Hu .................... G06F 8/47 717/173 |

FOREIGN PATENT DOCUMENTS

| CN | 1744096   A | 3/2006  |
| CN | 102509039 A | 6/2012  |
| CN | 104156243 A | 11/2014 |
| CN | 104436656 A | 3/2015  |

(Continued)

OTHER PUBLICATIONS

International search report issued in corresponding application No. PCT/CN2019/100836 dated Nov. 18, 2019.

(Continued)

*Primary Examiner* — Lawrence S Galka

(57) ABSTRACT

A method for game running and related products are provided. The method is applicable to an electronic device and the method includes the following. A game to be run is determined. A first file of the game is downloaded by requesting a network. The first file is decompressed to obtain a second file decompressed. At least one game engine is called to load the second file to run the game.

16 Claims, 4 Drawing Sheets

(56) References Cited

FOREIGN PATENT DOCUMENTS

| CN | 105376244 A | 3/2016 |
| CN | 105413176 A | 3/2016 |
| CN | 107368410 A | 11/2017 |
| CN | 107861736 A | 3/2018 |
| CN | 107886552 A | 4/2018 |
| CN | 109324816 A | 2/2019 |
| EP | 2437508 A2 | 4/2012 |
| WO | 2017050094 A1 | 3/2017 |

OTHER PUBLICATIONS

European Search Report issued in corresponding European Application No. 19195525.1 dated Feb. 27, 2020.
English translation of First Office Action issued in corresponding CN application No. 201811101060.7 dated Mar. 20, 2020.
PlayStation: "Downloading Games PS4", YouTube; dated Dec. 22, 2016, p. 1, XP054980230.
First Examination Report for IN Application 201914034083 dated Feb. 11, 2021. (7 pages).
China Examination Report with English Translation for CN Application 201811101060.7 dated Apr. 2, 2021. (16 pages).
Communication pursuant to Article 94(3) EPC issued in corresponding European Application No. 19195525.1 dated Dec. 2, 2020.
The second office action issued with English Translation in corresponding CN Application No. 201811101060.7 dated Oct. 30, 2020.

* cited by examiner

METHOD FOR GAME LOADING AND RELATED PRODUCTS

CROSS-REFERENCE TO RELATED APPLICATION(S)

This application claims priority to Chinese Application Patent Serial No. 201811101060.7, filed on Sep. 20, 2018, the entire disclosure of which is hereby incorporated by reference.

TECHNICAL FIELD

This disclosure relates to the technical field of electronic devices, and more particularly to a method for game running and related products.

BACKGROUND

With the popularity of electronic devices such as mobile phones, tablets, etc., the electronic devices can support an increasing number of applications and have powerful functions. The electronic devices are developing in a diversified and personalized way, becoming indispensable electronic products in daily life.

In particular, games are widely used in the electronic devices. The existing games are running based on localization, that is, after installation of a file of a game, the game can be played. This manner is based on local operations and has poor user experience.

SUMMARY

Implementations of the present disclosure provide a method for game running and related products, which can implement game calling based on a network and can implement game loading without installing a game file (i.e. a game application-related file) locally, thereby improving experience of playing games.

According to a first aspect of the implementations of the present disclosure, a method for game running is provided. The method is applicable to an electronic device. The method includes the following. A game to be run is determined. A first file of the game is downloaded by requesting a network. The first file is decompressed to obtain a second file decompressed. At least one game engine is called to load the second file to run the game.

According to a second aspect of the implementations of the present disclosure, an electronic device is provided. The electronic device includes at least one processor and a computer readable storage. The computer readable storage is coupled to the at least one processor and stores at least one computer executable instruction thereon which, when executed by the at least one processor, is operable with the at least one processor to: determine a game to be run; download a first file of the game by requesting a network; decompress the first file to obtain a second file decompressed; and call at least one game engine to load the second file to run the game.

According to a third aspect of the implementations of the present disclosure, a non-transitory computer readable storage medium is provided. The non-transitory computer readable storage medium is configured to store a computer program which, when executed by a processor, causes the processor to carry out some of or all operations described in the first aspect of the implementations of the present disclosure.

BRIEF DESCRIPTION OF THE DRAWINGS

In order to describe technical solutions of implementations of the present disclosure or the related art more clearly, the following will give a brief description of accompanying drawings used for describing the implementations of the present disclosure or the related art. Apparently, accompanying drawings described below are merely some implementations of the present disclosure. Those of ordinary skill in the art can also obtain other accompanying drawings based on the accompanying drawings described below without creative efforts.

DETAILED DESCRIPTION

Figure 1:
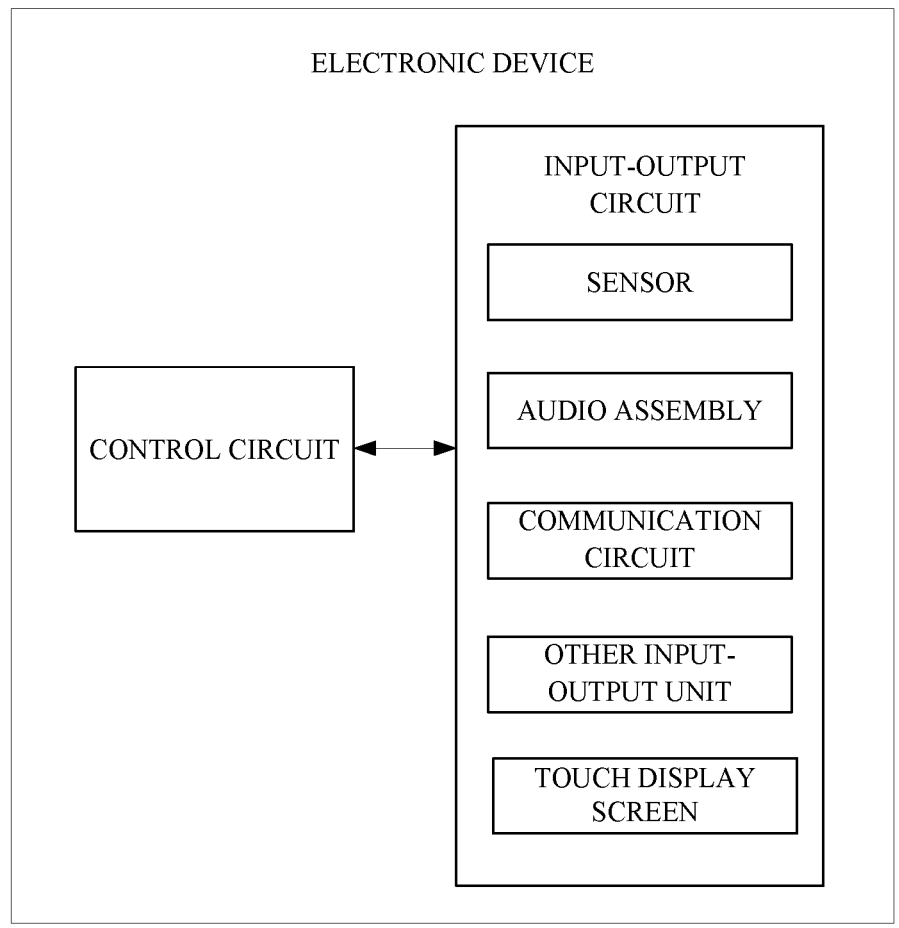
FIG. 1 is a schematic structural diagram illustrating an electronic device according to an implementation of the present disclosure.

In order for those skilled in the art to better understand technical solutions of the present disclosure, the technical solutions of implementations of the present disclosure will be described clearly and completely with reference to accompanying drawings in the implementations of the present disclosure. Apparently, implementations described hereinafter are merely some implementations, rather than all implementations, of the present disclosure. All other implementations obtained by those of ordinary skill in the art based on the implementations of the present disclosure without creative efforts shall fall within the protection scope of the present disclosure.

The terms "first", "second", and the like used in the specification, the claims, and the accompany drawings of the present disclosure are used to distinguish different objects rather than describe a particular order. Further, the terms "include", "comprise", and "have" as well as variations thereof are intended to cover non-exclusive inclusion. For example, a process, method, system, product, or device including a series of steps or units is not limited to the listed steps or units; on the contrary, it can optionally include other steps or units that are not listed; alternatively, other steps or units inherent to the process, method, product, or device can be included either.

"Implementation" mentioned in the present disclosure means that specific characteristics, structures, or properties described in connection with an implementation may be included in at least one implementation of the present disclosure. This word displayed at each position in the specification does not refer to the same implementation as well as an independent or alternate implementation mutually exclusive to other implementations. It may be explicitly and implicitly understood by those skilled in the art that the implementations described in the present disclosure may be combined with the other implementations.

Hereinafter, implementations of the present disclosure will be described in detail.

According to an implementation of the disclosure, a method for game running is provided. The method is applicable to an electronic device. The method includes the following. A game to be run is determined. A first file of the game is downloaded by requesting a network. The first file is decompressed to obtain a second file decompressed. At least one game engine is called to load the second file to run the game.

According to an implementation of the disclosure, an electronic device is provided. The electronic device includes at least one processor and a computer readable storage. The computer readable storage is coupled to the at least one processor and stores at least one computer executable instruction thereon which, when executed by the at least one processor, is operable with the at least one processor to: determine a game to be run; download a first file of the game by requesting a network; decompress the first file to obtain a second file decompressed; and call at least one game engine to load the second file to run the game.

According to an implementation of the disclosure, a non-transitory computer readable storage medium is provided. The non-transitory computer readable storage medium is configured to store a computer program which, when executed by a processor, causes the processor to carry out following actions. A game to be run is determined. A first file of the game is downloaded by requesting a network. The first file is decompressed to obtain a second file decompressed. At least one game engine is called to load the second file to run the game.

Implementations of the disclosure will be detailed below with reference to the accompanying drawings.

An electronic device described in the implementations of the present disclosure may include various handheld devices (e.g., a smart phone), on-board devices, wearable devices, and computing devices with wireless communication functions, or other processing devices connected to a wireless modem, as well as various forms of user equipment (UE), mobile stations (MS), terminal devices, development/test platforms, servers, etc. For convenience of description, the above-mentioned devices are collectively referred to as electronic devices.

Referring to FIG. 1, FIG. 1 is a schematic structural diagram illustrating an electronic device according to an implementation of the present disclosure. The electronic device includes a control circuit and an input-output circuit. The input-output circuit is coupled with the control circuit.

The control circuit can include a storage-processing circuit. A storage circuit of the storage-processing circuit may be a memory, such as a hard drive memory, a non-transitory memory (such as a flash memory, other electronically programmable read-only memories used to form a solid-state drive, or the like), a transitory memory (such as a static random access memory, dynamic random access memory, or the like), or the like, which is not limited herein. A processing circuit of the storage-processing circuit is configured to control operations of the electronic device. The processing circuit can be implemented based on one or more microprocessors, microcontrollers, digital signal processors, baseband processors, power management units, audio codec chips, application-specific integrated circuits, display driver integrated circuits, and the like.

The storage-processing circuit can be configured to run software of the electronic device, such as an application for playing an incoming-call prompting ringing, an application for playing a short-message prompting ringing, an application for playing an alarm-clocking ringing, an application for playing a media file, a voice over Internet protocol (VOIP) phone call application, an operating system function, and the like. The software may be used to perform some control operations, such as playing an incoming call alert ring, playing a short message alert ring, playing an alarm alert ring, playing a media file, making a voice call, and other functions of the electronic device, which is not limited herein.

The input-output circuit can be configured to achieve data input and data output of the electronic device, that is, to allow the electronic device to receive data from an external device and to allow the electronic device to output data to an external device.

The input-output circuit may include a sensor. The sensor may include an ambient light sensor, an optical or capacitive infrared proximity sensor, an ultrasonic sensor, a touch sensor (e.g., based on an optical touch sensor and/or a capacitive touch sensor, where the touch sensor may be a part of a touch display screen or may be used independently as a touch sensor structure), an acceleration sensor, a gravity sensor, and other sensors. The input-output circuit may further include an audio assembly. The audio assembly may be configured to provide the electronic device with audio input and output functions. The audio assembly may include tone generators, and other assemblies for generating and detecting sound.

The input-output circuit may further include one or more display screens. The display screen may be one or more of a liquid crystal display, an organic light emitting diode display, an electronic ink display, a plasma display, and display screens based on other display technologies. As an implementation, the display screen includes an array of touch sensors (i.e., the display screen can be a touch display screen). The touch sensor may be a capacitive touch sensor formed by an array of transparent touch sensor electrodes (e.g., indium tin oxide (ITO) electrodes), or may be a touch sensor formed with other touch technologies, such as acoustic touch, pressure sensitive touch, resistance touch, optical touch, and the like, and implementations of the present disclosure are not particularly restricted.

The input-output circuit may further include a communication circuit. The communication circuit is configured to provide the electronic device with a capability for communication with external devices. As an implementation, the communication circuit includes analog/digital input-output interface circuits, and wireless communication circuits based on radio frequency signals and/or optical signals. The wireless communication circuit of the communication circuit may include a radio frequency transceiver circuit, a power amplifier circuit, a low-noise amplifier, a switch, a filter, and an antenna. As an example, the wireless communication circuit of the communication circuit includes a circuit for supporting near field communication (NFC) by transmitting and receiving near field coupled electromagnetic signals. For example, the communication circuit includes an NFC antenna and an NFC transceiver. As another implementation, the communication circuit further includes transceivers and antennas for cellular telephone, transceiver circuits and antennas for wireless local area network, and the like.

The input-output circuit may further include other input-output units. The other input-output units include but are not limited to buttons, joysticks, click wheels, scroll wheels, touch pads, keypads, keyboards, cameras, light-emitting diodes, and other status indicators.

The electronic device may further include a battery (not illustrated) for supplying power to the electronic device.

Hereinafter, implementations of the disclosure will be described in detail.

Figure 2:
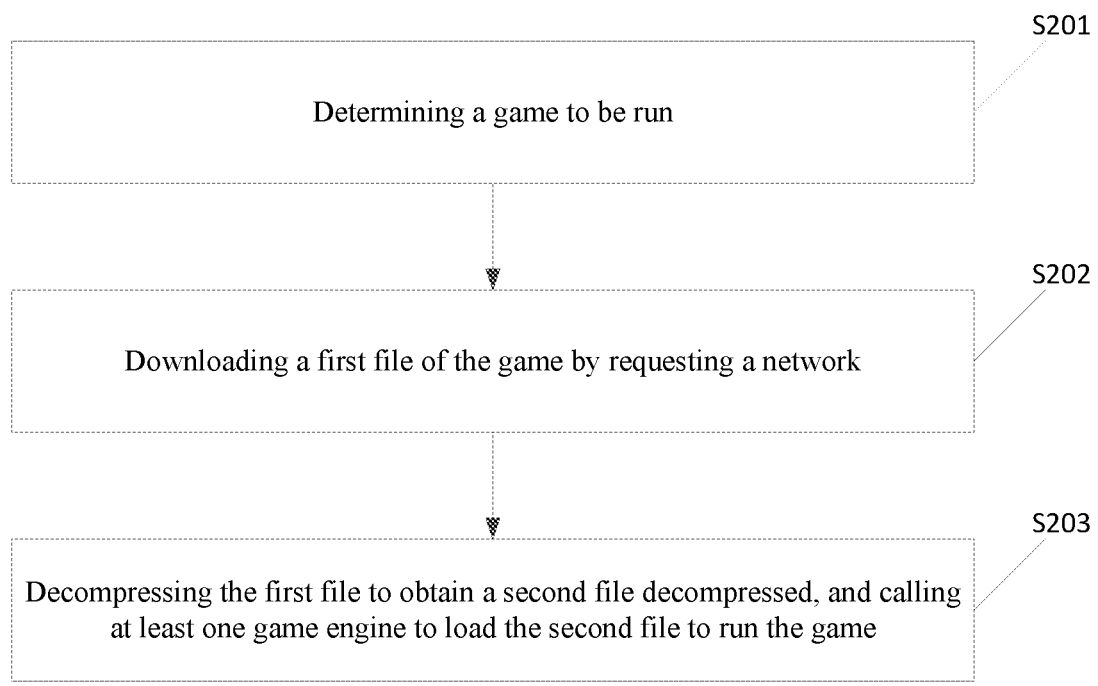
FIG. 2 is a schematic flow chart illustrating a method for game running according to a first implementation of the present disclosure.

Referring to FIG. 2, a method for game running is provided with reference to FIG. 2. The method is applicable to the electronic device illustrated in FIG. 1. As illustrated in FIG. 2, the method includes the following.

At S201, a game to be run is determined.

At S202, a first file of the game is downloaded by requesting a network.

At S203, the first file is decompressed to obtain a second file decompressed, and at least one game engine is called to load the second file to run the game.

The first file includes all data that needs to be called when the determined game is loaded via the at least one game engine, which is not limited herein. The second file will be directly called by the at least one game engine for execution after the first file is decompressed.

The game engine (or can be referred to as "engine") described in the implementations of the present disclosure may be in a form of software, is pre-configured by an operating system, and is applicable to load any type of game.

According to the technical solution provided by the present disclosure, after the game to be run is determined, the first file of the game is directly downloaded from the network, and then the first file is decompressed and the at least one game engine is called to load the second file to run the game. Since the game mentioned above is requested from the network, there is no need to install the game locally, which improves user experience.

In an implementation, the at least one game engine is called to load the second file to run the game as follows. Underlying rendering capability is called via an application programming interface (API) of the game engine to render the second file. The game engine calls game rules of the game. Game interface rendered is run according to the game rules to run the game.

As an example, the game engine determines a storage address of data to be rendered, and calls C++ underlying rendering capability via the API to render the data corresponding to the storage address.

APIs are predefined functions, and aim to provide applications and developers with capabilities that can access, without accessing source codes or understanding details of internal working mechanism, a set of routines based on certain software or hardware.

In an implementation, when multiple game engines are included, the at least one game engine is called to load the second file to run the game as follows. According to a mapping relationship between games and the multiple game engines, the engine for the game is determined. The engine is called to load the second file to run the game. In this implementation, the mapping relationship between games and the multiple game engines can be preset in advance.

In an implementation, the method further includes the following. First duration of loading the game via the engine is recorded. When the first duration is longer than a preset time threshold, the game is loaded via the remaining of the multiple game engines respectively. Respective duration of loading the game via the remaining of the multiple game engines respectively is recorded. Shortest second duration is determined from the respective duration of loading the game via the remaining of the multiple game engines respectively. When the second duration is shorter than the first duration, an engine for the game in the mapping relationship is replaced with an engine corresponding to the second duration.

In this technical solution, a scheme for updating the mapping relationship is provided. When the duration of loading the game according to the existing mapping relationship is long, the game may be loaded via other engines respectively, and respective duration of loading the game via the other engines respectively is recorded. The shortest second duration is determined from the respective duration of loading the game via the other engines respectively. When the second duration is shorter than the first duration, it can be determined that the engine corresponding to the second duration takes less time to load the game than the engine for the game in the existing mapping relationship, and efficiency of loading the game is higher. To this end, the existing mapping relationship can be directly replaced, thereby further shortening duration of loading the game.

In an implementation, the method further includes the following. Every set time interval, the game is loaded via the multiple game engines respectively, and respective duration of loading the game via the multiple game engines respectively is recorded. Shortest third duration is determined from the respective duration of loading the game via the multiple game engines respectively. An engine corresponding to the third duration is determined as an engine for the game.

This technical solution is used for fixed updating, that is, an update of the mapping relationship is performed every set interval, thereby avoiding the problem that the duration of loading the game is long due to adopting an old mapping relationship.

In an implementation, the electronic device includes n engines capable of running the game, where n is an integer larger than or equal to 3. The electronic device divides the n engines into a main engine and multiple secondary engines. The main engine divides a task of loading the game into multiple sub-tasks. The main engine sends the multiple sub-tasks to the multiple secondary engines for execution, respectively. The multiple secondary engines execute the sub-tasks assigned to obtain multiple sub-results. The multiple secondary engines return the multiple sub-results to the main engine. The main engine combines the multiple sub-results to complete the loading of the game.

The technical solution is to assign the task of the game to the multiple game engines for execution. When there are multiple engines capable of running the game, the engines may be divided into the main engine and the multiple secondary engines. In this case, the main engine is mainly responsible for assignment and feedback of the task, and the secondary engines are mainly responsible for calculation, so that parallel calculation can be realized, thus reducing the delay.

The above-mentioned division manner for determining a main JavaScript (JS) engine and multiple secondary JS engines includes, but is not limited to, a preset division manner, that is, an engine with the strongest processing capability among the multiple engines (i.e., an engine with the largest number of threads) is determined to be the main engine, and the other engines are determined to be the secondary engines. Considering that more serial data is allocated for the main engine, and time taken by processing the serial data directly affects overall processing efficiency, an engine with the strongest processing capability is thus determined as the main engine.

Also, the division of the main JS engine and the multiple secondary JS engines may also be based on a connection relationship. As an implementation, among the multiple engines one engine connected to most of the multiple engines is determined as the main engine. For example, if there are five engines, and one of the five engines is connected to the other four engines, then the engine is determined to be the main engine. This manner is to avoid a situation of data forwarding, that is, direct transmission of data from the main engine to the secondary engines can be realized, thereby reducing the time for data transmission.

In an implementation, when multiple game engines are included, the at least one game engine is called to load the second file to run the game as follows. Multiple processing sub-tasks capable of being executed by the multiple game engines are obtained. Multiple data types corresponding to the multiple processing sub-tasks are determined. The task of the game is divided into multiple sub-tasks according to the multiple data types. The multiple sub-tasks are assigned to the multiple game engines to run the game.

In an implementation, the multiple processing sub-tasks capable of being executed by the multiple game engines may be: a rendering processing capable of being executed by a first engine, an audio processing capable of being executed by a second engine, a network insertion processing capable of being executed by a third engine, a storage processing capable of being executed by a fourth engine, and so on. The specific representation of the multiple processing sub-tasks is not limited in the present disclosure. The data type corresponding to the processing sub-task may be presented as follows. For example, a data type corresponding to the rendering processing is an image type, a data type corresponding to the audio processing is an audio type, and the like. In this way, according to the multiple data types corresponding to the multiple processing sub-tasks capable of being executed by the multiple game engines, the task of the game can be divided, so that the loading of the game can be well executed by the multiple engines, thereby improving a speed of game loading.

In an implementation, when multiple game engines are included, the at least one game engine is called to load the second file to run the game as follows. Multiple system evaluation indexes of the multiple game engines are obtained. According to the multiple system evaluation indexes, an engine having an optimal system evaluation is determined. The engine is called to load the second file to run the game.

The system evaluation index include, but is not limited to, a heat dissipation rate, a central processing unit (CPU) load, response time, and a throughput, which are not limited herein.

The response time refers to time taken by that a user feels that he or she is severed by a software system, in other words, refers to a time interval required for a system to feed back a user input. For a website system, the response time refers to a time interval from a time point of clicking a link of a page to another time point of displaying the page in a browser. In an implementation, according to different subjects performing a response operation, the response time may include the following. A, response time of a server, which mainly refers to time taken by the server to finish a transaction request, and does not include time taken for a response from a client to the server (communication time taken for requesting and network). The response time of the server can reflect a processing capability of the server. B, response time of a network, which mainly refers to time taken by a network hardware to transmit transaction requests and transaction results. C, response time of the client, which mainly refers to time taken by the client to construct a request and present a transaction result. In addition, as for the throughput, throughput operations are configured to process requests and output processing results. Therefore, the throughput reflects the "rice amount" of the software system, that is, the processing capabilities of the software system. That is, the throughput indicates the number of transactions/requests/unit data processed by the software system per unit time. A resource utilization mainly includes at least one of: a CPU usage rate, a memory usage rate, disk I/O, and network I/O.

Figure 3:
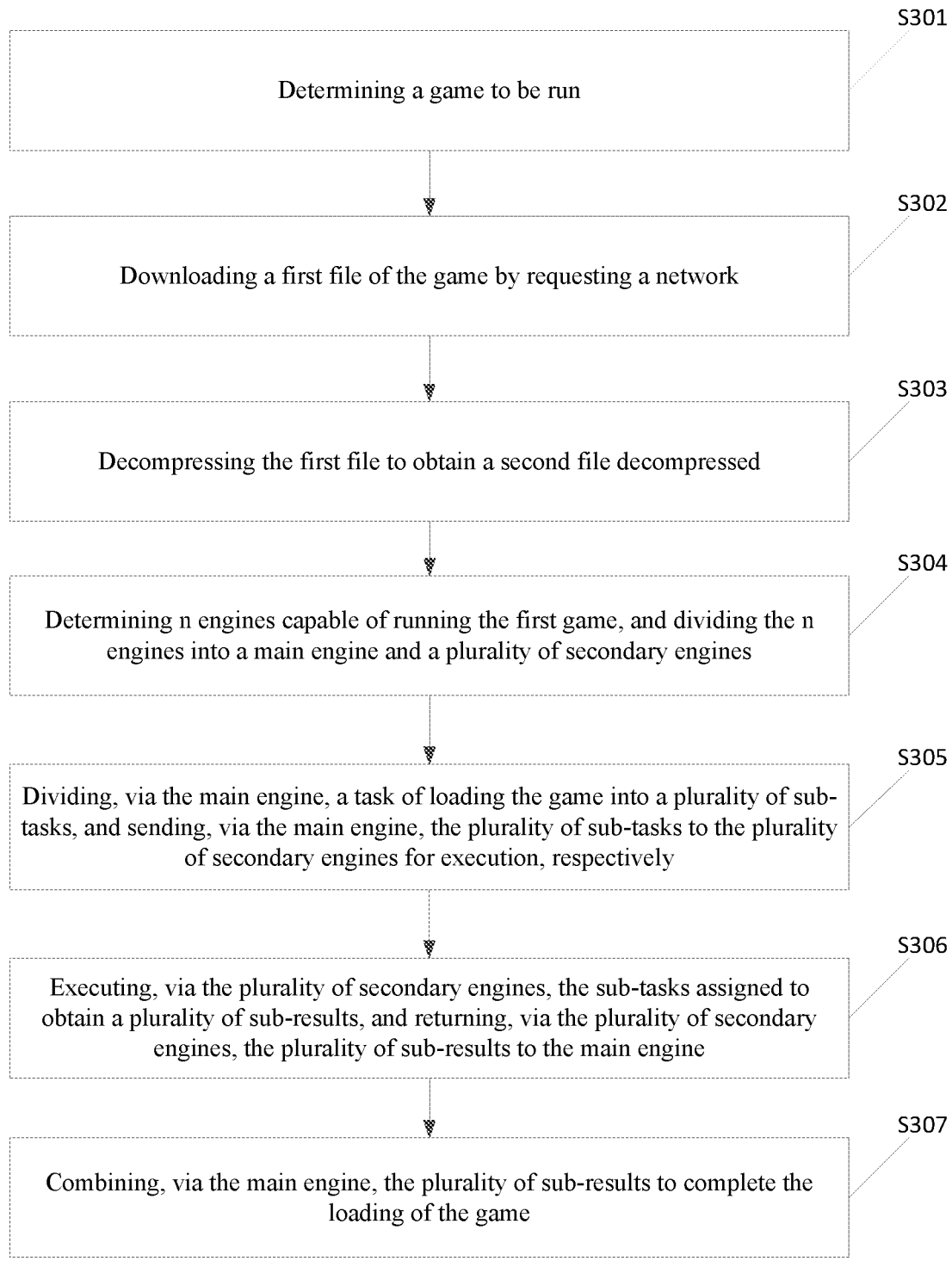
FIG. 3 is a schematic flow chart illustrating a method for game running according to another implementation of the present disclosure.

Referring to FIG. 3, a method for game running is provided with reference to FIG. 3. The method is applicable to the electronic device illustrated in FIG. 1. The method includes the following.

At S301, a game to be run is determined.

At S302, a first file of the game is downloaded by requesting a network.

At S303, the first file is decompressed to obtain a second file decompressed.

At S304, n engines capable of running the game are determined, and the n engines are divided into a main engine and multiple secondary engines.

At S305, the main engine divides a task of loading the game into multiple sub-tasks, and sends the multiple sub-tasks to the multiple secondary engines for execution, respectively.

At S306, the multiple secondary engines execute the sub-tasks assigned to obtain multiple sub-results, and return the multiple sub-results to the main engine.

At S307, the main engine combines the multiple sub-results to complete the loading of the game.

According to the technical solution provided by the present disclosure, after the game to be run is determined, the first file of the game is directly downloaded by requesting the network, and then at least one game engine is called to load the second file to run the game after the first file is decompressed. Since the game is requested from the network, there is no need to install the game locally, thereby improving user experience.

In the technical solution of the present disclosure, after a game platform (i.e., a management tool that provides users with capabilities to download related files) is initialized, a JS engine loads an API interface to call underlying capability, so that the game platform can directly convert a capability-calling instruction into a corresponding API command upon receipt of the capability-calling instruction. The API command is transmitted to the JS engine to call the underlying capability, thereby facilitating a developer to call underlying capability of the game platform and improving the speed of game development.

Figure 4:
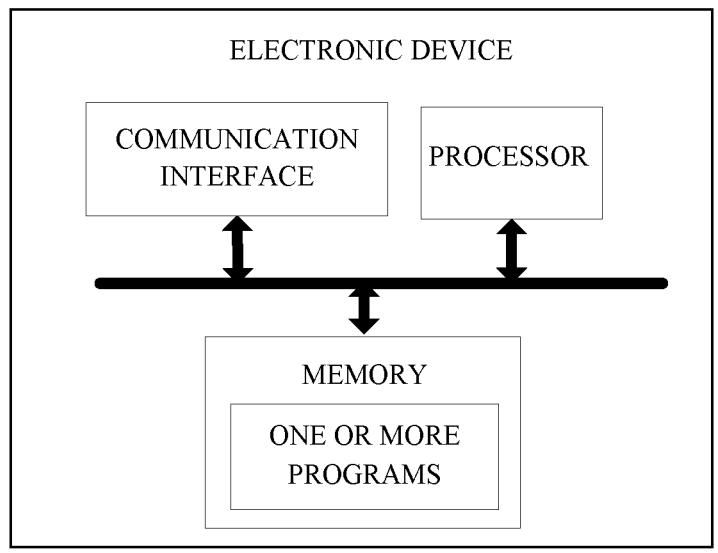
FIG. 4 is a schematic structural diagram illustrating an electronic device according to another implementation of the present disclosure.

Referring to FIG. 4, FIG. 4 is a schematic structural diagram illustrating an electronic device according to another implementation of the present disclosure. The electronic device includes at least one processor, a computer readable storage (e.g., a memory), a communication interface, and one or more programs (i.e., at least one computer executable instruction). The one or more programs are stored in the memory and include instructions which, when executed by the processor, are operable with the processor to: determine a game to be run; download a first file of the game by requesting a network; decompress the first file to obtain a second file decompressed; and call at least one game engine to load the second file to run the game.

According to the technical solutions provided by the present disclosure, after the game to be run is determined, the first file of the game is directly downloaded by requesting the network, and then the at least one game engine is called to load the second file to run the game after the first file is decompressed. Since the game is requested from the network, there is no need to install the game locally, which improves user experience.

In a possible implementation, the at least one game engine is embodied as one game engine, in terms of calling the at least one game engine to load the second file to run the game, the one or more programs include instructions operable with the processor to: call underlying rendering capability via an API of the game engine; render the second file to obtain game interface rendered; call game rules of the game via the game engine; and run, according to the game rules, game interface rendered to run the game.

In a possible implementation, the at least one game engine is embodied as one game engine for the game, in terms of calling the at least one game engine to load the second file to run the game, the one or more programs include instructions operable with the processor to: determine, according to a mapping relationship between games and multiple game engines, the game engine for the game; and call the game engine for the game to load the second file to run the game.

In a possible implementation, the one or more programs further include instructions operable with the processor to: record first duration of loading the game via the game engine; load, based on that the first duration is longer than a preset time threshold, the game via the remaining of the multiple game engines respectively; record respective duration of loading the game via the remaining of the multiple game engines respectively; extract shortest second duration from the respective duration of loading the game via the remaining of the multiple game engines respectively; and replace, based on that the second duration is shorter than the first duration, a game engine for the game in the mapping relationship with a game engine corresponding to the second duration.

In a possible implementation, the one or more programs further include instructions operable with the processor to: load, every set time interval, the game via the multiple game engines respectively; record respective duration of loading the game via the multiple game engines respectively; determine shortest duration from the respective duration of loading the game via the multiple game engines respectively; and replace the game engine for the game in the mapping relationship with a game engine corresponding to the shortest duration.

In a possible implementation, at least one game engine is embodied as one game engine for the game among multiple game engines, in terms of calling the game engine to load the second file to run the game, the one or more programs include instructions operable with the processor to: obtain multiple system evaluation indexes of the multiple game engines; determine a game engine having a maximum system evaluation index as the game engine for the game; and call the game engine for the game to load the second file to run the game.

In a possible implementation, the at least one game engine is embodied as multiple game engines, in terms of calling the game engine to load the second file to run the game, the one or more programs include instructions operable with the processor to: obtain multiple processing sub-tasks capable of being executed by the multiple game engines; determine multiple data types corresponding to the multiple processing sub-tasks; divide a task of the game into multiple sub-tasks according to the multiple data types; and assign the multiple sub-tasks to the multiple game engines to run the game.

In a possible implementation, the at least one game engine is embodied as n game engines, and n is an integer larger than or equal to 3, in terms of calling the game engine to load the second file to run the game, the one or more programs include instructions operable with the processor to: divide the n game engines into a main game engine and multiple secondary game engines; divide, via the main game engine, a task of loading the game into multiple sub-tasks; send, via the main game engine, the multiple sub-tasks to the multiple secondary game engines for execution, respectively; execute, via the multiple secondary game engines, the sub-tasks assigned to obtain multiple sub-results; return, via the multiple secondary game engines, the multiple sub-results to the main game engine; and combine, via the main game engine, the multiple sub-results to complete the loading of the game.

It should be understood that the implementation process will not be detailed herein and reference may be made to the foregoing method implementations.

The foregoing technical solutions of implementations of the disclosure are mainly described from a perspective of execution of the method. It can be understood that, in order to implement the above functions, the electronic device includes hardware structures and/or software modules for performing respective functions. Those of ordinary skill in the art will appreciate that units and algorithmic operations of various examples described in connection with implementations herein can be implemented in hardware or a combination of computer software and hardware. Whether these functions are implemented by means of hardware or computer software driving hardware depends on the particular application and the design constraints of the associated technical solution. For a specific application, those skilled in the art may use different methods to implement the described functionality, but such implementation should not be regarded as beyond the scope of the disclosure.

In implementations of the present disclosure, the electronic device can be divided into different functional units according to the above method implementations. For example, the electronic device can be divided into different functional units corresponding to each function, or two or more functions may be integrated into one processing unit. The integrated unit can take the form of hardware or a software functional unit. It is to be noted that, division of units provided herein is illustrative and is just a logical function division. In practice, there can be other manners of division.

Figure 5:
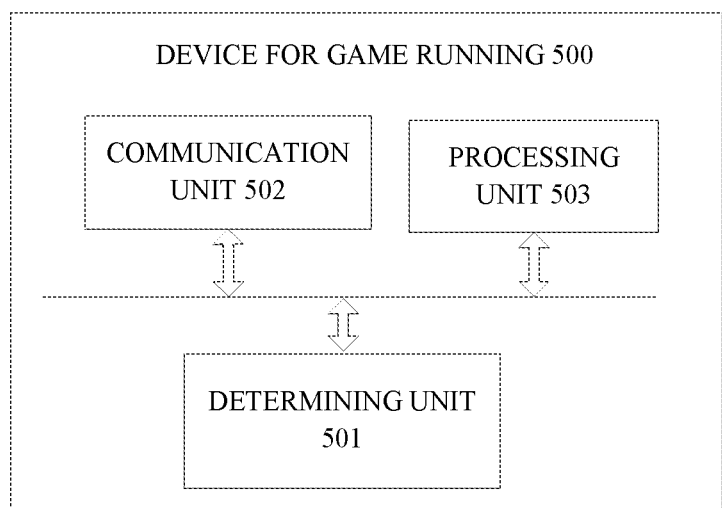
FIG. 5 is a schematic structural diagram illustrating a device for game running according to an implementation of the present disclosure.

Referring to FIG. 5, FIG. 5 is a schematic structural diagram illustrating a device for game running according to an implementation of the present disclosure. The device is applicable to the electronic device illustrated in FIG. 1. A device for game running 500 includes a determining unit 501, a communication unit 502, and a processing unit 503. The determining unit 501 is configured to determine a game to be run. The communication unit 502 is configured to download a first file of the game by requesting a network. The processing unit 503 is configured to decompress the first file to obtain a second file decompressed and to call at least one game engine to load the second file to run the game.

According to the technical solutions provided by the present disclosure, after the game to be run is determined, the first file of the game is directly downloaded by requesting the network, and then the at least one game engine is called to load the second file to run the game after the first file is decompressed. Since the game is requested from the network, there is no need to install the game locally, which is possible to improve user experience.

In an implementation, the processing unit 503 is configured to: call underlying rendering capability via an API of the game engine to render the second file; call game rules of the game via the game engine; and run, according to the game rules, game interface rendered to run the game.

In an implementation, multiple game engines are included, the processing unit 503 is configured to: determine, according to a mapping relationship between games and the multiple game engines, an engine for the game; and call the engine to load the second file to run the game.

It should be understood that the implementation process will not be detailed herein and reference may be made to the foregoing method implementations.

It is to be noted that, the electronic device described in the implementations of the disclosure are presented in the form of functional units. The term "unit" used herein should be understood as the broadest meaning as possible, and an object for implementing functions defined by each "unit" may be, for example, an application-specific integrated circuit (ASIC), a single circuit, a processor (shared, dedicated, or chipset) and a memory for executing one or more software or firmware programs, a combinational logic circuit, and/or other suitable assemblies that can achieve the above described functions.

According to implementations of the disclosure, a computer storage medium is further provided. The computer storage medium is configured to store computer programs for electronic data interchange. The computer programs are operable with a computer to execute some of or all operations of any of the methods for game running described in the foregoing method implementations.

According to implementations of the present disclosure, a computer program product is further provided. The computer program product includes a non-transitory computer readable storage medium configured to store computer programs. The computer programs are operable with a computer to execute some of or all operations of any of the methods for game running described in the foregoing method implementations.

It is to be noted that, for the sake of simplicity, the foregoing method implementations are described as a series of action combinations. However, it will be appreciated by those skilled in the art that the present disclosure is not limited by the sequence of actions described. The reason is that, according to the present disclosure, certain steps or operations may be executed in other orders or simultaneously. Besides, it will be appreciated by those skilled in the art that the implementations described in the specification are exemplary implementations and the actions and modules involved are not necessarily essential to the present disclosure.

In the foregoing implementations, the description of each implementation has its own emphasis. For the parts not described in detail in one implementation, reference may be made to related descriptions in other implementations.

In the implementations of the present disclosure, the device disclosed in implementations provided herein may be implemented in other manners. For example, the device/apparatus implementations described above are merely illustrative; for instance, the division of the unit is only a logical function division and there can be other manners of division during actual implementations, for example, multiple units or assemblies may be combined or may be integrated into another system, or some features may be ignored or not performed. In addition, coupling or communication connection between each illustrated or discussed component may be direct coupling or communication connection, or may be indirect coupling or communication among devices or units via some interfaces, and may be electrical connection, or other forms of connection.

The units described as separate components may or may not be physically separated, the components illustrated as units may or may not be physical units, that is, they may be in the same place or may be distributed to multiple network elements. All or part of the units may be selected according to actual needs to achieve the purpose of the technical solutions of the implementations.

In addition, the functional units in various implementations of the present disclosure may be integrated into one processing unit, or each unit may be physically present, or two or more units may be integrated into one unit. The above-mentioned integrated unit can be implemented in the form of hardware or a software function unit.

The integrated unit may be stored in a computer-readable memory when it is implemented in the form of a software functional unit and is sold or used as a separate product. Based on such understanding, the technical solutions of the present disclosure essentially, or the part of the technical solutions that contributes to the related art, or all or part of the technical solutions, may be embodied in the form of a software product which is stored in a memory and includes instructions for causing a computer device (which may be a personal computer, a server, or a network device, and so on) to execute all or part of the steps described in the various implementations of the present disclosure. The memory includes various medium capable of storing program codes, such as a universal serial bus (USB) flash disk, a read-only memory (ROM), a random-access memory (RAM), a removable hard disk, a magnetic disk, a compact disc (CD), or the like.

It will be understood by those of ordinary skill in the art that all or part of the steps of the various methods of the implementations described above may be accomplished by means of a program to instruct associated hardware, and the program may be stored in a computer-readable memory, which may include a flash memory, a ROM, a RAM, a magnetic disk, or a CD, and so on.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method for game running, the method being applicable to an electronic device, and the method comprising:
   determining a game to be run;
   downloading a first file of the game by requesting a network;
   decompressing the first file to obtain a second file decompressed;
   calling at least one game engine to load the second file to run the game, wherein the at least one game engine is embodied as one game engine for the game, and wherein calling the at least one game engine to load the second file to run the game comprises:
      determining, according to a mapping relationship between games and a plurality of game engines, the game engine for the game; and
      calling the game engine for the game to load the second file to run the game;
   recording first duration of loading the game via the game engine;
   loading, based on the first duration being longer than a preset time threshold, the game via the remaining of the plurality of game engines respectively;

recording respective duration of loading the game via the remaining of the plurality of game engines respectively;

determining shortest second duration from the respective duration of loading the game via the remaining of the plurality of game engines respectively; and replacing, based on the second duration being shorter than the first duration, the game engine for the game in the mapping relationship with a game engine corresponding to the second duration.

2. The method of claim 1, wherein the at least one game engine is embodied as one game engine; and calling the at least one game engine to load the second file to run the game comprises:

calling underlying rendering capability via an application programming interface (API) of the game engine;

rendering the second file to obtain game interface rendered;

calling game rules of the game via the game engine; and running, according to the game rules, the game interface rendered to run the game.

3. The method of claim 1, further comprising:

loading, every set time interval, the game via the plurality of game engines respectively;

recording respective duration of loading the game via the plurality of game engines respectively;

determining shortest duration from the respective duration of loading the game via the plurality of game engines respectively; and replacing the game engine for the game in the mapping relationship with a game engine corresponding to the shortest duration.

4. The method of claim 1, wherein the at least one game engine is embodied as one game engine for the game among a plurality of game engines; and calling the at least one game engine to load the second file to run the game comprises:

obtaining a plurality of system evaluation indexes of the plurality of game engines;

determining a game engine having a maximum system evaluation index as the game engine for the game; and calling the game engine for the game to load the second file to run the game.

5. The method of claim 1, wherein the at least one game engine is embodied as a plurality of game engines; and calling the at least one game engine to load the second file to run the game comprises:

obtaining a plurality of processing sub-tasks capable of being executed by the plurality of game engines;

determining a plurality of data types corresponding to the plurality of processing sub-tasks;

dividing a task of the game into a plurality of sub-tasks according to the plurality of data types; and assigning the plurality of sub-tasks to the plurality of game engines to run the game.

6. The method of claim 1, wherein the at least one game engine is embodied as n game engines, wherein n is an integer larger than or equal to 3; and calling the at least one game engine to load the second file to run the game comprises:

dividing the n game engines into a main game engine and a plurality of secondary game engines;

dividing, via the main game engine, a task of loading the game into a plurality of sub-tasks;

sending, via the main game engine, the plurality of sub-tasks to the plurality of secondary game engines for execution, respectively;

executing, via the plurality of secondary game engines, the sub-tasks assigned to obtain a plurality of sub-results;

returning, via the plurality of secondary game engines, the plurality of sub-results to the main game engine; and combining, via the main game engine, the plurality of sub-results to complete the loading of the game.

7. An electronic device, comprising:

at least one processor; and a computer readable storage, coupled to the at least one processor and storing at least one computer executable instruction thereon which, when executed by the at least one processor, is operable with the at least one processor to:

determine a game to be run;

download a first file of the game by requesting a network;

decompress the first file to obtain a second file decompressed;

call at least one game engine to load the second file to run the game, comprising:

determine, according to a mapping relationship between games and a plurality of game engines, a game engine for the game, wherein the at least one game engine is embodied as the game engine for the game; and call the game engine for the game to load the second file to run the game;

load, every set time interval, the game via the plurality of game engines respectively;

record respective duration of loading the game via the plurality of game engines respectively;

determine shortest duration from the respective duration of loading the game via the plurality of game engines respectively; and replace the game engine for the game in the mapping relationship with a game engine corresponding to the shortest duration.

8. The electronic device of claim 7, wherein the at least one computer executable instruction operable with the at least one processor to call the at least one game engine to load the second file to run the game is operable with the at least one processor to:

call underlying rendering capability via an API of a game engine, wherein the at least one game engine is embodied as the game engine;

render the second file to obtain game interface rendered;

call game rules of the game via the game engine; and run, according to the game rules, the game interface rendered to run the game.

9. The electronic device of claim 7, wherein the at least one computer executable instruction is further operable with the at least one processor to:

record first duration of loading the game via the game engine;

load, based on that the first duration is longer than a preset time threshold, the game via the remaining of the plurality of game engines respectively;

record respective duration of loading the game via the remaining of the plurality of game engines respectively;

determine shortest second duration from the respective duration of loading the game via the remaining of the plurality of game engines respectively; and replace, based on that the second duration is shorter than the first duration, the game engine for the game in the mapping relationship with a game engine corresponding to the second duration.

10. The electronic device of claim 7, wherein the at least one computer executable instruction operable with the at least one processor to call the at least one game engine to load the second file to run the game is operable with the at least one processor to:

obtain a plurality of system evaluation indexes of a plurality of game engines, wherein the at least one game engine is embodied as one game engine for the game among the plurality of game engines;

determine a game engine having a maximum system evaluation index as the game engine for the game; and call the game engine for the game to load the second file to run the game.

11. The electronic device of claim 7, wherein the at least one computer executable instruction operable with the at least one processor to call the at least one game engine to load the second file to run the game is operable with the at least one processor to:

obtain a plurality of processing sub-tasks capable of being executed by a plurality of game engines, wherein the at least one game engine is embodied as the plurality of game engines;

determine a plurality of data types corresponding to the plurality of processing sub-tasks;

divide a task of the game into a plurality of sub-tasks according to the plurality of data types; and assign the plurality of sub-tasks to the plurality of game engines to run the game.

12. The electronic device of claim 7, wherein the at least one computer executable instruction operable with the at least one processor to call the at least one game engine to load the second file to run the game is operable with the at least one processor to:

divide n game engines into a main game engine and a plurality of secondary game engines, wherein the at least one game engine is embodied as the n game engines, and n is an integer larger than or equal to 3;

divide, via the main game engine, a task of loading the game into a plurality of sub-tasks;

send, via the main game engine, the plurality of sub-tasks to the plurality of secondary game engines for execution, respectively;

execute, via the plurality of secondary game engines, the sub-tasks assigned to obtain a plurality of sub-results;

return, via the plurality of secondary game engines, the plurality of sub-results to the main game engine; and combine, via the main game engine, the plurality of sub-results to complete the loading of the game.

13. A non-transitory computer readable storage medium, configured to store a computer program which, when executed by a processor, causes the processor to carry out actions, comprising:

determining a game to be run;

downloading a first file of the game by requesting a network;

decompressing the first file to obtain a second file decompressed; and calling at least one game engine to load the second file to run the game, comprising:

obtaining a plurality of system evaluation indexes of a plurality of game engines, wherein the at least one game engine is embodied as one game engine for the game among the plurality of game engines;

determining a game engine having a maximum system evaluation index as the game engine for the game; and calling the game engine for the game to load the second file to run the game.

14. The non-transitory computer readable storage medium of claim 13, wherein the computer program executed by the processor to carry out the action of calling the at least one game engine to load the second file to run the game is executed by the processor to carry out actions, comprising:

calling underlying rendering capability via an API of a game engine, wherein the at least one game engine is embodied as the game engine;

rendering the second file to obtain game interface rendered;

calling game rules of the game via the game engine; and running, according to the game rules, the game interface rendered to run the game.

15. The non-transitory computer readable storage medium of claim 13, wherein the computer program executed by the processor to carry out the action of calling the at least one game engine to load the second file to run the game is executed by the processor to carry out actions, comprising:

obtaining a plurality of processing sub-tasks capable of being executed by a plurality of game engines, wherein the at least one game engine is embodied as the plurality of game engines;

determining a plurality of data types corresponding to the plurality of processing sub-tasks;

dividing a task of the game into a plurality of sub-tasks according to the plurality of data types; and assigning the plurality of sub-tasks to the plurality of game engines to run the game.

16. The non-transitory computer readable storage medium of claim 13, wherein the computer program executed by the processor to carry out the action of calling the at least one game engine to load the second file to run the game is executed by the processor to carry out actions, comprising:

dividing n game engines into a main game engine and a plurality of secondary game engines, wherein the at least one game engine is embodied as the n game engines, and n is an integer larger than or equal to 3;

dividing, via the main game engine, a task of loading the game into a plurality of sub-tasks;

sending, via the main game engine, the plurality of sub-tasks to the plurality of secondary game engines for execution, respectively;

executing, via the plurality of secondary game engines, the sub-tasks assigned to obtain a plurality of sub-results;

returning, via the plurality of secondary game engines, the plurality of sub-results to the main game engine; and combining, via the main game engine, the plurality of sub-results to complete the loading of the game.

* * * * *